United States Patent [19]

Kimmel et al.

[11] E Patent Number: Re. 33,048

[45] Reissued Date of Patent: Sep. 5, 1989

[54] MARINE ANTI-FOULING COATING FORMULATIONS CONTAINING A SOLUBLE PHASE INCLUDING A ORGANOTIN POLYMER IN COMBINATION WITH AN INSOLUBLE PHASE INCLUDING A CROSSLINKED ORGANOTIN POLYMER

[75] Inventors: Albert L. Kimmel, Kansas City, Mo.; Cecil C. Chappelow, Jr., Leawood, Kans.; Vincent J. Castelli, Severan Park, Md.

[73] Assignee: Midwest Research Institute, Kansas City, Mo.

[21] Appl. No.: 141,131

[22] Filed: Jan. 6, 1988

Related U.S. Patent Documents

Reissue of:

[64] Patent No.: 4,599,368
Issued: Jul. 8, 1986
Appl. No.: 666,727
Filed: Oct. 31, 1984

[51] Int. Cl.[4] ..... C08K 5/57; C08L 33/02

[52] U.S. Cl. ..... 523/122; 523/177; 523/220; 428/907; 524/493

[58] Field of Search ..... 523/122, 177, 220; 428/907; 514/493

[56] References Cited

U.S. PATENT DOCUMENTS

| | | | |
|---|---|---|---|
| 2,970,923 | 2/1961 | Sparmann | 106/15 |
| 3,167,473 | 1/1965 | Leebrick | 167/38.6 |
| 3,575,123 | 4/1971 | Shepherd et al. | 114/67 R |
| 3,979,354 | 9/1976 | Dyckman et al. | 523/400 |
| 4,021,392 | 5/1977 | Milne et al. | 524/471 |
| 4,098,971 | 7/1978 | Phillip et al. | 525/274 |
| 4,104,234 | 8/1978 | Bednarski et al. | 523/177 |
| 4,139,515 | 2/1979 | Dennington | 524/431 |
| 4,157,999 | 6/1979 | Matsuda et al. | 523/122 |
| 4,174,339 | 11/1979 | Matsuda et al. | 523/177 |
| 4,187,211 | 2/1980 | Robinson et al. | 524/431 |
| 4,191,579 | 3/1980 | Hails et al. | 524/561 |
| 4,221,839 | 9/1980 | de Graaf | 428/413 |
| 4,262,097 | 6/1981 | Dawans et al. | 525/271 |
| 4,314,850 | 2/1982 | Watanabe et al. | 524/561 |
| 4,407,997 | 10/1983 | Sghibartz | 524/560 |
| 4,439,555 | 3/1984 | Doi et al. | 524/182 |
| 4,482,652 | 11/1984 | Datta | 523/122 |
| 4,485,197 | 11/1984 | Yokol et al. | 523/177 |

OTHER PUBLICATIONS

Navy Technical Disclosure Bulletin vol. 8 #4, Jun. 1983, pp. 87-92.

Navy Report DTNSR DC/SME-78-92.

*Primary Examiner*—Herbert J. Lilling

*Attorney, Agent, or Firm*—Merchant, Gould, Smith, Edell, Welter & Schmidt

[57] ABSTRACT

A coating composition for marine structures containing a soluble acrylic organotin polymer and a soluble metal-free acrylic polymer, in combination with an insoluble crosslinked organotin polymer, and an insoluble filler in a coating composition solvent can provide a tough, durable flexible coating and can provide extended protection to marine structures from the growth or accumulation of marine organisms.

24 Claims, No Drawings

MARINE ANTI-FOULING COATING FORMULATIONS CONTAINING A SOLUBLE PHASE INCLUDING A ORGANOTIN POLYMER IN COMBINATION WITH AN INSOLUBLE PHASE INCLUDING A CROSSLINKED ORGANOTIN POLYMER

Matter enclosed in heavy brackets [ ] appears in the original patent but forms no part of this reissue specification; matter printed in italics indicates the additions made by reissue.

This invention was made with Government support under Contract [N0060-76-C-1002] *N00600-76-C-1002* awarded by the Department of the Navy. The Government has certain rights in the invention.

FIELD OF THE INVENTION

The invention relates to containing compositions that can be applied to marine structures such as ships, piers, oil drilling platforms, submerged pipelines, and others. The coating compositions of the invention must form a film which can set and dry rapidly to a hard-tough but flexible coating that is strongly bonded to the structure and can prevent the growth of accumulating of marine organisms by generating an effective concentration of a biocide at the coating surface.

BACKGROUND OF THE INVENTION

The growth of marine organisms on structures exposed to fresh or salt water is a problem having both practical and aesthetic aspects. Typical marine growth commonly involves both plants and animals such as sea moss, various forms of algae, acorn shells, goose muzzles, barnacles, tube worms, etc. Marine growth can be unsightly and can reduce the operating efficiency of marine equipment such as heat exhangers, gates, dry docks, ships, pipelines, etc.

A major problem relates to marine growth on ships' hulls. Marine organisms in substantial accumulations on ships' hulls can increase the energy needed to propel a ship leading to either an increase in fuel consumption or substantial reduction in ship speed. Marine organisms accumulate on exposed hull surfaces at a rate such that they cannot be economically removed in dry dock.

One alternative which has been attempted in the past involves applying to the ship's hull or other marine structure a coating that incorporates a biocide which is slowly released at the surface of the coating to form a concentration lethal to the organism.

Useful marine anti-fouling coatings or paints must form a hard, flexible, relatively smooth film that can remain uncracked and unblistered for an extended period of time of up to five years or more. Further, during its useful life, the coating must provide an effective marine biocidal concentration of a biocidal composition at the surface of the coating that can prevent the accumulation or growth of marine organisms.

Many such coatings have been proposed. The following is a discussion of representative types.

Sparman, U.S. Pat. No. 2,970,923 teaches essentially monomeric tri-substituted methyl halides which can be used in coating compositions. James, U.K. Pat. No. 1,124,297 teaches an anti-fouling coating composition comprising an organotin-containing polymer vehicle and a water soluble pigment which in combination can increase the biocidal efficiency of the coating. Leebrick, U.S. Pat. No. 3,167,473 teaches homopolymers and copolymers of trialkyl tin methacrylate in an anti-fouling coating composition containing a vinyl resin, an acrylic resin or an alkyd resin vehicle base, pigments, thickeners, fillers, or driers blended in commonly available solvents. Hopewell, U.S. Pat. No. 3,575,123 teaches hydrophilic acrylic resins made from a hydrophilic acrylic monomer containing in the polymer matrix essentially monomeric organo metallic compounds such as trialkyl tin halide, triaryl tin halide, and others. Hopewell teaches that the hydrophilic acrylic resin can be crosslinked to reduce the resistance experienced by moving watercraft. Dennington, U.S. Pat. No. 4,139,515 discloses an aqueous emulsion of a copolymer of a triorganotin salt of an olefinically unsaturated carboxylic acid and another unsaturated comonomer in combination with a substantially water insoluble metal containing pigment that is capable of reacting with sea water to form a water soluble metal compound. Matsuda, U.S. Pat. No. 4,157,999 teaches a novel copolymer containing copolymerized units of a substituted tin monomer and a specific aromatic monomer. DeGraff, U.S. Pat. No. 4,221,839 teaches combining essentially monomeric toxic solid organo metallic compounds with a water insoluble binder and a water soluble binder in order to produce a coating composition which in response to the mechanical action of the water, wears at a sufficient rate to release an effective biocidal concentration of the organo metallic. Dawans, U.S. Pat. No. 4,262,097 teaches an organo metallic polymer composition which is formed by grafting onto a main chain consisting of a chlorinated polymer, at least one chain of recurring units of an organotin monomer. Watanabe, U.S. Pat. No. 4,314,850 teaches an antifouling coating composition containing an essentially monomeric triaryl tin compound, a resinous vehicle and an organic solvent.

In our developmental efforts we have found that by following the directions of the prior art and forming anti-fouling coating compositions from a homopolymer or interpolymer of a trialkyl tin acrylate compound and blending the homopolymer or interpolymer with a solvent, vehicle, filler, thickener, or pigment, the resulting compositions over an extended period of time either cannot form a hard, flexible, stable coating which can survive the marine environment or cannot provide an effective biocidal amount of trialkyl tin compound to prevent the growth or accumulation of marine organisms.

Accordingly, a substantial need exists for a coating composition which can be applied to marine surfaces that can survive intact in the marine environment without substantial cracking, blistering or peeling and can provide an effective biocidal concentration of the trialkyl tin compound at the surface of the coating for an extended period of time.

BRIEF DESCRIPTION OF THE INVENTION

We have found a marine coating composition that forms a tough, flexible film, that has an extended lifetime in the marine environment and can release an effective amount of a marine biocide for a year or more, which comprises a coating composition solvent, ingredients which are solvent soluble, and a portion which are solvent insoluble. The soluble ingredients comprise an effective film-forming amount of a hydrophobic organotin acrylic polymer composition, and a metal-free acrylic polymer film-forming agent. The insoluble ingredients comprise an effective biocidal amount of a solvent insoluble crosslinked organotin acrylic polymer composition, an effective biocide-releasing amount of an inorganic filler composition. The preferred coating compositions of the invention can also contain other components such as a pigment, a filler, a thickener, a binding agent, or mixtures thereof.

While we do not wish to be limited to a theory of action of the invention, we believer that the hydrophobic film-forming organotin acrylic polymer in combination with a metal free acrylic film-forming polymer provides a sufficiently tough, flexible film for the marine environment. The inorganic filler introduces a degree of porosity or organotin availability to the film. The crosslinked organotin acrylic polymer in combination with the organotin groups in the film-forming organotin acrylic polymer acts to provide a sufficient loading of triorganotin in the coating composition to maintain a high effective biocidal concentration on the marine coating surface for an extended period of time. In this way [the] the solvent soluble and the solvent insoluble components appear to interact in the coating to produce a long wearing coating having an anti-fouling capacity superior to prior coating compositions.

DETAILED DESCRIPTION OF THE INVENTION

Film-Forming Organotin Polymer

The anti-fouling marine coating of the invention can contain a hydrophobic film-forming organotin polymer composition which is commonly a homopolymer or interpolymer of a monomer having an organotin group and olefinically unsaturated group or vinyl group. The organotin polymers of the invention are: (1) substantially hydrophobic and have few hydrophilic groups in the polymers that would change the basic hydrophobic film-forming nature of the composition; (2) efficient in generating an effective toxicant concentration of labile organotin at the coating surface; and (3) alone or in combination with the metal-free acrylic polymers, able to form a sufficiently tough, flexible film for the marine environment. The organic substituents in the organotin group can be aliphatic, aromatic or unsaturated. Typical aliphatic groups can contain 1 to 10 carbon atoms such as methyl, ethyl, n-propyl, isopropyl, n-butyl, isobutyl, t-butyl, amyl, 2-ethyl-hexyl, neooctyl, cyclohexyl, 4-methyl-cyclohexyl, 2-chlorocyclohexyl, 2-nitro-cyclohexyl, 3-t-butyl cyclohexyl, 2-methyl cyclohexyl, etc. The aliphatic groups may also contain other substituent groups that do not interfere with either the generation of a biocidal concentration of organotin at the coating surface, the polymerization of the tin-containing polymer or the blending of the anti-fouling coating preferred aliphatic groups contain 2 to 5 carbon atoms, such as ethyl, n-propyl, isopropyl, n-butyl, t-butyl and amyl. The substituents can also be primary $C_{6-12}$ aryl, such as phenyl, chlorophenyl, nitrophenyl, tolyl, xylyl, ethyl phenyl, etc.

Typical triorganotin containing polymers are homopolymers or interpolymers of methacrylic, acrylic or vinyl monomers such as tri-n-butyl tin acrylate, tri-n-propyl tin acrylate, tri-isopropyl tin acrylate, tri-isobutyl tin acrylate, tri-benzyl tin acrylate, ditertiary butyl methyl tin acrylate, di-n-propyl ethyl tin acylate, tribenzyl tin acrylate, tri-n-butyl tin methacrylate, tri-n-propyl tin methacrylate, tri-isopropyl tin methacrylate, tri-tertiary-butyl tin methacrylate, triethyl tin acrylate, di-tertiary butyl ethyl tin methacrylate, di-n-propyl methyl tin methacrylate, tribenzyl tin methacrylate, tri-n-butyl tin adduct of vinyl alcohol, etc. or mixtures thereof. The tin-containing polymers of this invention may also be an interpolymer of one or more of the ethylenically unsaturated tri organotin containing monomers and one or more of another ethylenically unsaturated comonomer free of organotin groups. Commonly hydrophobic ethylenically unsaturated comonomers which can be used to prepare the interpolymer include acrylic monomers such as methylacrylate, methylmethacrylate, ethylacrylate, acrylic acid, methacrylamide, acrylamide, acrylonitrile, and other vinyl monomers such as vinyl chloride, styrene, parachlorostyrene, vinyl acetate, vinyl butyrate, dialkyl maliate, etc.

Preferred hydrophobic organotin-containing acrylic polymer compositions are interpolymers or copolymers of a trialkyl tin acrylic or methacrylic compound and an acrylic monomer such as acrylic acid, methacrylic acid, methylacylate, methylmethacrylate, or mixtures thereof. Typically, the composition of the film-forming interpolymer contains about 30 to 50 mole % of the ethylenically unsaturated tri-organotin-containing acrylic monomer and about 50 to 70 mole % of the metal free acrylic monomer. The polymers have a molecular weight ranging between 26,000 and 100,000. The alkyl substituents of the tri-organotin group include ethyl, propyl, isopropyl, n-butyl, isobutyl, tertiary butyl, or mixtures thereof. The most preferred hydrophobic organo-tin-containing acrylic polymer compositions is a copolymer of tri-n-butyl tin methacrylate, and methylmethacrylate wherein there are about 30 to 50 mole % tri-n-butyl tin methacrylate, and 50 to 70 mole % methylmethacrylate. These polymers have a molecular weight ranging from about 45,000 to 70,000. A commercial example of the most preferred film forming hydrophobic organotin-containing acrylic polymer composition are the Biomet 300 family of products of the M&T Corporation.

CROSSLINKED ORGANOTIN POLYMER

The hydrophobic insoluble crosslinked organotin polymeric compositions are similar to the organotin polymers described above except they are substantially crosslinked. The hydrophobic crosslinked organotin species are crosslinked sufficiently to render them insoluble in the coating composition solvent, are compatible with the film forming components of the coating composition, and have organotin groups which are sufficiently labile to aid in the generation of an effective toxicant concentration at the coating surface. In addition they must exist in a finely divided particulate state which is sufficiently small to permit the ready dispersion of the particles in the coating composition solvent.

The particles are most commonly in a particle size range of about 1 to 250 microns. Preferably the particle size ranges from about 2 to 100 microns and has a particle size distribution such that less than 0.5% of the particles are retained by a −200 mesh screen. Most preferably, for reasons of ease of preparation of the coating compositions and ready availability of the oranotin compounds to diffusion from the coating, the particle size ranges from about 5 to 75 microns and has a particle size distribution such that less than 0.2% of the material is retained by −325 mesh screen.

The crosslinking of the resin results in a substantial increase in the molecular weight of the polymer matrix and results in a sharp reduction of the solubility of the crosslinked polymer molecules in coating composition solvents. We have found that these insoluble crosslinked species can be added to the coating composition to substantially increase the available amount of organotin in the coating composition. The substantially increased organotin loading in the coatings insures that the coating composition can release a higher effective biocidal concentration of organotin species at the coating surface for an extended period of time.

The crosslinked hydrophobic organotin polymeric compositions can be obtained by (1) attached organotin groups to a crosslinked polymer which contains active sites such as pendent hydroxy or carboxy groups or (2) polymerizing the tin-containing monomer with a crosslinking agent and optionally other monomers. Typical crosslinked polymers are (1) copolymers and interpolymers prepared with styrene derivatives and a cross-linking agent; or (2) copolymers and interpolymers of acrylic acid, methacrylic acid, or mixtures thereof and a crosslinking agent.

The organic substituents of the organotin groups can be aliphatic, aromatic, or unsaturated. Typical aliphatic groups an contain 1 to 10 carbon atoms, such as methyl, ethyl, n-propyl, isopropyl, n-butyl, iso-butyl, amyl, 2-ethylhexyl, neooctyl, cyclohexyl, 4-methylcyclohexyl, 4-chlorocyclohexyl, 3-nitrocyclohexyl, 3-t-butyl cyclohexyl, 2-methylcyclohexyl, etc. The aliphatic groups may also contain other substituents groups that either do not interfere with the generation of the biocidal organotin composition at the coating surface, the polymerization of the crosslinked organo-tin-containing polymer, or the blending of the antifouling coatings. Preferred aliphatic groups contain 2 to 5 carbon atoms such as ethyl, n-propyl, isopropyl, n-butyl, t-butyl, amyl, etc. The substituents can also be primarily $C_{6-18}$ aryl such as phenyl, chlorophenyl, nitrophenyl, tolyl, xylyl, ethylphenyl, 2-ethylhexylphenyl, nonylphenyl, etc. The preferred crosslinked polymers are copolymers and interpolymers of acrylic acid, methacrylic acid, or mixtures thereof and a crosslinking agent. These polymers may be prepared with comonomers which need not contribute active sites, such as pendent carboxy groups, to the polymer and need not contribute to the crosslinking of the polymers.

Common ethylenically unsaturated comonomers which can be used include acrylic monomers such as methylacrylate, methylmethacrylate, ethylacrylate, acrylic acid, methacrylamide, acrylamide, acrylonitrile, and other vinyl monomers such as vinyl chloride, styrene, parachlorostyrene, vinyl acetate, vinyl butyrate, dialkyl maleate, etc.

The important characteristic of the crosslinked polymer used in this invention is that they contain either a sufficient number of active sites to which organotin groups can be attached or sufficient organotin on the monomers used to form the crosslinked polymer, which provides for the generation of an effective toxicant concentration, and are sufficiently crosslinked so that they are insoluble in the coating composition solvent.

Crosslinking agents which can be used to prepare the crosslinked organotin-containing polymers contain 2 or more technically unsaturated polymerizable groups separated by a group of sufficient size to permit the polymerizable group to be included in separate polymer chains. Commonly crosslinking agents are added to a polymerization mixture in proportions of from about 0.05 to 15 mole-%, preferably 0.1 to 5 mole % based on the polymerization mixture. Typical examples of effective ethylenically unsaturated crosslinking agents include ethylene glycol diacrylate, ethylene glycol dimethacrylate, 1,2-butylene glycol dimethacrylate, 1,3-butylene glycol dimethacrylate, 1,4-butylene glycol dimethacrylate, 1,1,1-trimethylolpropane trimethacrylate, divinyl benzene, diallyl tartrate, diallyl maleate, N,N'-methylene-bis-acrylamide, ethylene glycol vinyl allyl citrate, and many others known to those skilled in the art.

Preferred crosslinked hydrophobic organotin containing polymers are the products of the reaction of a trialkyltin compound with a crosslinked copolymer or interpolymer of methacrylic acid, acrylic acid, or mixtures thereof and a crosslinking agent. Typically, the crosslinked copolymer is prepared from 80 to 95 mole % acrylic monomer and 5 to 20 mole % of the crosslinking agent. The alkyl substituents on the tin are typically ethyl, propyl, isopropyl, n-butyl, isobutyl, tertiary butyl, or mixtures thereof.

The most preferred crosslinked hydrophobic organotin containing polymer is the product of the reaction between bis(tri-n-butyl tin) oxide and the crosslinked copolymer of methacrylic acid and divinyl benzene wherein the crosslinked copolymer is prepared from 87 to 93 mole % methacrylic acid and 7 to 13 mole % divinyl benzene. A commercial example of the bis(tri-n-butyl tin) oxide of the Biomet TBTO family of products of the M & T Corporation. A commercial example of the crosslinked copolymer is the Amberlite IRC-50 family of products of the Rohm & Haas Company.

METAL FREE FILM-FORMING RESIN

The film forming characteristics of the hydrophobic triorganotin acrylic composition can be augmented by the use of commonly available film-forming acrylic resins. These resins are similar to the organotin film-forming resin described above except that they are substantially free of organotin groups. The resins that can be used to augment the film-forming capacity of the compositions of the invention are substantially hydrophobic resins made by polymerizing commonly available ethylenically unsaturated monomers such as acrylic monomers, vinyl esters, vinyl halides, styrenes and other ethylenically unsaturated monomers. The monomer blend prior to polymerization should be adjusted so that the final polymer has substantial hydrophobic film-forming capacity. Preferred resins used for augmenting the film-forming capability of the invention include homopolymers and interpolymers of alkyl acrylate and alkyl methacrylate monomers. Commonly the alkyl groups are methyl, ethyl, isopropyl, tertiary butyl, amyl, lauryl, etc. The molecular weight of the preferred film-forming copolymers range from about 50,000 to 100,000.

The most preferred resin for augmenting the film-forming characteristics of the invention are butyl methacrylate polymers having a molecular weight of about 50,000 to 100,000. A commercial example of the most preferred resins for augmenting the film forming characteristics of the invention are the Acryloid F-10 family of products of the Rohm and Haas Company.

Substantially any nonaqueous solvent common in acrylic coating formulations can also be used to form the anti-fouling compositions of the invention. Typical examples of aliphatic or aromatic, polar and non-polar solvents include naptha, mineral spirits, acetone, methyisobutyl ketone, ethyl acetate, amyl acetate, methanol, ethanol, isopropanol, tertiary butanol, turpentine, benzene, cellosolve, etc. And mixtures thereof.

The anti-fouling coating compositions of the invention can contain an inorganic filler which aids in film formation and can also aid in insuring the ready availability of the triorganotin compound to the surface of the coating composition. Typical inorganic fillers are *clays* byorites, silica, and silicate compositions which can be dispersed in the coating composition solvent and which can cooperate with the hydrophobic triorganotin-containing acrylic and the film-forming acrylic in forming a hard durable marine coating. Typical silica or silicate fillers include silica (silicon dioxide), aluminum silicate, calcium silicate, magnesium silicate, mixed metal silicates, etc. Further information regarding silica fillers which can be used in the coatings of this invention can be found in Kirk-Othmer Encyclopedia of Chemical Technology, 2nd Edition, Volume 18, pp. 46–105, which discloses a great deal of information regrading silica, amorphous silica, vitreous silica, silicates and their associated properties.

The anti-fouling coating composition of the invention can also contain thickeners such as commonly available clays and modified clays which can be used to modify the viscosity of the composition in order to ease application. A commercial example is the Bentone family of products of NL Industries, Inc. Information regarding clays and their uses can be found in Kirk-Othmer Encyclopedia of Chemical Technology, 2nd Edition, volume 5, pp. 541–586.

The anti-fouling coating compositions can also contain pigments which can aid in indicating the amount and location of the coating composition, can aid in military camouflage and can aid in locating the marine structure. Such pigments can include titanium dioxide, black ferric oxide, carbon black, and others depending on the desired color. Further information regarding the nature and composition of other pigment compositions can be found in Kirk-Othmer Encyclopedia of Chemical Technology, 2nd Edition, Volume 15, pp. 495–605.

The anti-fouling coating compositions of the invention can contain a variety of other compositions such as surfactants, perfumes, preservatives, anti-foam agents, etc. which aid in the blending, handling and application of the coating composition.

The anti-fouling coating compositions of the invention commonly contain about 8 to 28 parts of a film-forming hydrophobic tri-organotin acrylic polymer, about 6 to 30 parts of the crosslinked hydrophobic organotin acrylate composition, about 3 to 24 parts of the inorganic filler composition, about 1 to 6 parts of the metal free film forming acrylic polymer, and about 45 to 56 parts of the coating composition. The preferred anti-fouling coating compositions of the invention commonly contain about 12 to 16 parts of the hydrophobic film-forming triorganotin acrylic polymer, about 8 to 20 parts of the acrylic hydrophobic crosslinked triorganotin acrylic composition, about 2 to 5 parts of the tin free acrylic film-forming composition, about 5 to 22 parts of the inorganic filler, and about 48 to 53 parts of the coating composition solvent. The most preferred anti-fouling coating composition of the invention contains about 10 to 15 parts of a hydrophobic organotin copolymer of tri-n-butyl tin methacrylate, and methylmethacrylate, about 8 to 9 parts of the acrylic hydrophobic crosslinked tri-n-alkyl tin acrylic composition, about 3 to 4 parts of a film-forming polymer of butylmethylmethacrylate, about 16 to 18 parts of an inorganic silicate filler, and about 50 to 55 parts of a coating composition solvent containing about 100 parts of mineral spirits with about 1 to 10 parts of methanol. The most preferred anti-fouling coating compositions can contain about 1 to 3 parts of a clay thickener, and about 1 to 4 parts of a pigment.

EXAMPLE 1

Into a number 2 Roalox mill jar was placed two quarts of small borundum grinding media (cylinders having ⅜ inch O.D. and ⅜ in length) and two quarts of medium grinding media (cylinders ½ inch O.D. and ½ in length). Into a separate number 3 Roalox mill jar was placed three quarts of small grinding media along with three quarts of medium grinding media. Into the number two jar was placed 75 grams of carbon black, 264.0 grams of an insoluble tri-n-butyl tin containing cross-linked resin made by reacting tri-n-butyl tin oxide with a copolymer of about 87 to 93 mole % methacrylic acid and 7 to 13 mole % of divinyl benzene, 528.0 grams of silica, 44.0 grams of a fumed silica, 880.0 grams of a 45 wt. % solution in mineral spirits of a tin containing acrylic polymer comprising a copolymer of tri-n-butyl tin methacrylate and methamethacrylate having 50 mole % tin containing monomer, 293.0 grams of a 40 wt. % solution in an aromatic naphtha solvent (90% mineral thinner and 10% ansco F.) homopolymer of butyl methacrylate having a molecular weight of about 75,000 and 441.0 grams of mineral spirits. The identical ingredients were placed in the number 3 Roalox jar except that the amounts were doubled. Into a separate 100 mL container was place 22.0 grams of a bentonite clay (Bentone 38) and 7.0 grams of 95 percent methanol. The mixture was blended until a paste was formed and the mixture was placed in the number 2 Roalox mill jar. After the paste was added, the mill jar was closed and sealed. A dry paste containing bentonite clay and methanol was prepared as exactly as above except that the amounts of the ingredients were exactly doubled. The dry paste was added to the #3 Roalox milljar. The mill jars were closed and sealed. Both Roalox were milled until the contents of the mill jar attained a Hagman number 5 fineness of grind (about 72 hours). The mill jars were opened and the resulting composition was emptied from each jar into a suitable container, retaining the grinding media in each jar. Into the number 2 Roalox jar was placed 500 grams of mineral spirits and into the number 3 Roalox was placed 1,000 grams of mineral spirits. The jars were rinsed with the mineral spirits and the contents of the jars and the coating compositions were combined and mixed until a uniform well disposed coating composition was formed.

Coating compositions of the Examples were tested on cold rolled steel panels having dimensions of ⅛ inch thickness, 10 inch width, 12 inch length with a ¼ inch hole, 1 inch from 174 and a 1 inch hole centered along the top 10 inch edge. The panels were primed and two primed panels were coated with a 2 to 4 mill dry film of the coatings Examples I through IV.

The coatings of the application were also applied in stripes on ships hulls from the water line to the keel. The ships were operated in the Pacific and Indian Oceans, in the Atlantic Ocean and in the Mediterranean Sea in the ordinary course of naval operation. The results of the testing of the coated panels and ships is shown in Tables II and III.

TABLE I

The method of Example I was repeated except that the following amounts of ingredients were substituted for the ingredients recited in Example I.

| | Example II | | Example III | | Example IV | |
|---|---|---|---|---|---|---|
| | #2 Jar | #3 Jar | #2 Jar | #3 Jar | #2 Jar | #3 Jar |
| Carbon Black | 75 | 150 | 80 | 160 | 15.6 | 31.2 |
| Insoluble Tin Containing Resin | 340 | 680 | 418 | 836 | 780 | 1560 |
| Silica | 510 | 1020 | 501 | 1004 | 117 | 234 |
| Cabosil (silica-fumed) | 20 | 40 | 25 | 50 | — | — |
| Bentonite (Clay) | 21.25 | 42.5 | 21 | 42 | 19.5 | 39 |
| Soluble Tin Containing Resin* | 850 | 1700 | 864 | 1728 | 1014 | 2028 |
| Soluble Film Forming Metal Free Resin** | 283 | 566 | 209 | 418 | 195 | 390 |
| Mineral Spirits | 910 | 1820 | 945 | 1890 | 516 | 1032 |
| Methanol (95%) | 8.5 | 17.0 | 7 | 14 | 7.8 | 15.6 |
| Xylol*** | — | — | — | — | 40 | 80 |
| Methyl-n-butyl Keton*** | — | — | — | — | 117 | 234 |

*45 wt. % in mineral spirits
**40 wt. % in aromatic naphtha solvent
***Added with mineral spirits We have found that the ratio, in the most preferred compositions, between the amount of soluble tin containing resin and the amount of the insoluble tin containing resin, and the ratio between the total amount of tin containing resin (soluble and insoluble) and the non-toxic binder materials (the tin-free acrylic resins) are important to forming a high performance coating composition. We have also found that, in the most preferred compositions, the type and amount of inorganic filler is important to insure the effective diffusion of sufficient tin compound to the surface of the coating to produce a sufficient bioavailable amount of toxic tin compound. The ratio of the amount of soluble tin containing resin to insoluble tin containing resin is about 0.5 to 1.8 parts by weight of the soluble tin containing resin per each part by weight [by] *of* the insoluble tin containing resin. The ratio of tin containing resin (both soluble and insoluble) to metal free resin is about 5 to 16 parts by weight of the tin containing resins per each part by weight of the metal free resin. The amount of silica in the coating can range from about 4 to 18 weight percent.

The anti-fouling coating compositions of the invention are commonly compounded using commonly available mixing equipment. While the order of addition of components is not critical, typically the organic and the inorganic constituents of the coating composition are added to a mixer followed by the solvent. The blending equipment is operated until the mixture obtains a uniform appearance and the coating composition can be withdrawn from the mixing equipment and drummed.

The fully compounded anti-fouling coating compositions of the invention typically contain about 8.5 to 9.5 lbs. of coating composition per gallon, has a viscosity according to Federal Standard 141-A Method 4281 of about 50 to 100 KU, a tin content based on solids of about 5 to 25 wt-%, and can be applied at a rate such that the final dry film thickness ranges from about 1 to 15 mils or more. Commonly the coating compositions of the invention can be applied to generally metallic surfaces with a sprayer, a brush or a roller.

An examination of the data recorded in Tables II and III reveals that the novel, unique coating composition prepared in the Examples can provide protection to ships bottoms in the marine environment and can prevent fouling (85% to 100% resistance to fouling) for up to six years. Applicant's coating compositions were tested along with coating compositions made by others

TABLE II

| | PANEL TEST OF COATINGS | | | | | | | | | |
|---|---|---|---|---|---|---|---|---|---|---|
| Example No. | IV | IV | IV | I | I | I | IV | I | IV | I |
| Number of Panels | 1 | 1 | 1 | 1 | 1 | 1 | 1 | 1 | 1 | 1 |
| Site | Miami | Pearl | Annapolis | Miami | Pearl | Annapolis | Pearl | Pearl | Pearl | Pearl |
| Film thickness (mil) | 2 to 3 | 2 to 3 | 4 | 2 to 3 | 2 to 3 | 4 | 4 | 4 | 4 | 4 |
| Total Fouling resistance (% free of fouling) @ | | | | | | | | | | |
| 6 mos. | 100 | 100 | 100 | 100 | 100 | 100 | 100 | 100 | 100 | 100 |
| 12 mos. | 100 | 100 | 100 | 100 | 100 | 100 | 100 | 100 | 100 | Lost |
| 18 mos. | 100 | 95 | 100 | 100 | 100 | 100 | 100 | 100 | 100 | |
| 24 mos. | 100 | 80 | 100 | 100 | 100 | 100 | 100 | 100 | — | |
| 30 mos. | 100 | eroded | 100 | Lost | eroded | 100 | 100 | — | — | |
| 36 mos. | Lost | | 100 | | | 100 | — | — | — | |
| 42 mos. | | | 100 | | | 100 | — | — | — | |
| 46 mos. | | | — | | | — | — | — | — | |
| 52 mos. | | | 100 | | | 100 | 100 | 100 | 100 | |

TABLE III

| | SHIP TEST OF COATINGS WATER LINE TO KEEL STRIDE | | | | | | | |
|---|---|---|---|---|---|---|---|---|
| | Example No. | | | | | | | |
| Ship Name | IV USS OUEL-LETTE | | I USS OUEL-LETTE | | IV USS INGRAM | | I USS INGRAM | |
| Stripe # | 1 | 2 | 1 | 2 | 1 | 2 | 1 | 2 |
| Area of Test Stripe ($ft^2$) | 100 | 100 | 100 | 100 | 100 | 100 | 100 | 100 |

from tri-n-alkyl-methacrylate containing coating compositions prepared by others. However, we understand, from the navy, that only the coating compositions disclosed in this application produced a hard-tough coating that could provide resistance to fouling for more than one year.

The above specification Examples and data are provided to illustrate and to promote an understanding of the invention. However, since many embodiments of the invention can be made without departing from the spirit [of] *or* the scope of the invention, the invention resides in the claims hereinafter appended.

We claim:

1. A coating composition that can be applied to marine surfaces to form a durable, tough, flexible film and can release an effective amount of a marine biocide, which comprises:

(a) an effective amount of a coating composition solvent;

(b) a portion soluble in the solvent comprising an effective biocidal amount of a film-forming organotin acrylic polymer composition and an effective film-forming amount of a metal-free acrylic polymer composition and;

(c) portion insoluble in the solvent comprising an effective biocidal amount of a crosslinked organotin acrylic polymer composition having sufficiently small suspendable particle size and an effective biocide releasing amount of an inorganic filler *selected from the group consisting of a byorite, a silica, a silicate, a clay, or a mixture thereof.*

2. The coating composition of claim 1 wherein the film-forming organotin acrylic polymer composition comprises an interpolymer of an acrylic monomer and [an] *a* trialkyl tin acrylic monomer.

3. The coating composition of claim 2 wherein the trialkyl tin acrylic monomer is a trialkyl tin methacrylate.

4. The coating composition of claim 3 wherein the trialkyl tin methacrylate is tri-n-butyl tin methacrylate.

5. The coating composition of claim 1 wherein the metal-free acrylic polymer composition is a homopolymer or interpolymer of butyl methacrylate, isobutyl methacrylate, methylmethacrylate, or mixtures thereof.

6. The coating composition of claim 1 which also contains a pigment, a thickener, or mixtures thereof.

7. The coating composition of claim 6 wherein the pigment comprises a black iron oxide, carbon black, or mixtures thereof.

8. The coating composition of claim 6 wherein the thickener is a clay-type thickener.

9. The coating composition of claim 1 wherein the coating composition solvent comprises an aliphatic solvent, a ketone solvent, an alcohol solvent, an aromatic solvent, or mixtures thereof.

10. A marine structure having a durable, tough, flexible film that can release an effective amount of a marine biocide for a year or more wherein the film comprises:

(a) in a continuous phase, an effective film-forming, biocidal amount of a hydrophobic organotin acrylic polymer composition, and a film-forming metal-free acrylic polymer composition; and (b) dispersed in the continuous phase an effective biocidal amount of [a] discrete particles having a sufficiently small dispersable particle size of a crosslinked organotin acrylic composition and an effective biocide releasing amount discrete particles of an inorganic filler *selected from the group consisting of a byorite, a silica, a silicate, a clay, or a mixture thereof.*

11. The structure of claim 10 wherein the organotin acrylic polymer composition comprises an interpolymer of an acrylic monomer and an trialkyl tin acrylic monomer.

12. The coating composition of claim 11 wherein the trialkyl tin acrylic monomer is a trialkyl tin methacrylate.

13. The coating composition of claim 12 wherein the trialkyl tin methacrylate is tri-n-butyl tin methacrylate.

14. The coating composition of claim 10 wherein the metal-free acrylic polymer composition is a homopolymer or interpolymer of butyl methacrylate, isobutyl methacrylate, methylmethacrylate, or mixture thereof.

15. The coating composition of claim 10 which also contains a pigment, a [thickner] *thickener*, or mixtures thereof.

16. The coating composition of claim 15 wherein the pigment comprises a black iron oxide[,] or carbon black[,].

17. The coating composition of claim 15 wherein the [thickner] *thickener is a clay-type* [thickner] *thickener.*

18. A method of inhibiting marine growth which comprises applying the coating composition of claim 1 to a surface exposed to the marine environment.

19. A coating composition that can be applied to marine surfaces to form a durable, tough, flexible film and can release an effective amount of a marine biocide, which comprises:

(a) about 45 to 56 parts of a coating composition solvent;

(b) a portion soluble in the solvent comprising about 8 to 28 parts of a film-forming hydrophobic triorganotin acrylic polymer and about 1 to 6 parts of a metal-free film-forming acrylic polymer; and (c) a portion insoluble in the solvent comprising about 6 to 30 parts of the crosslinked organotin acrylic polymer composition having a particle size of about 1 to 250 microns and about 3 to 24 parts of [the inorganic filler composition] *an inorganic filler selected from the group consisting of a byorite, a silica, a silicate, a clay, or a mixture thereof*: each component present per one hundred parts of the coating composition.

20. The composition of claim 19 wherein the coating composition solvent comprises mineral spirits and the inorganic filler comprises a silicate, a clay, [a carbon black] or mixtures thereof.

21. A coating composition that can be applied to marine surfaces to form a durable, tough, flexible film and can release an effective amount of a marine biocide, which comprises:

(a) about 48 to 53 parts of the coating composition solvent;

(b) a portion soluble in the solvent comprising 12 to 16 parts of a hydrophobic film-forming tri-n-butyl tin acrylic polymer, about 2 to 5 parts of the tin-free acrylic film-forming composition; and (c) a portion insoluble in the solvent comprising about 8 to 20 parts of a crosslinked tri-n-butyl tin acrylic composition and about 5 to 22 parts of an [organic] *inorganic* filler *selected from the group consisting of a byorite, a silica, a silicate, a clay, or mixtures thereof; each component present per one hundred parts of the coating composition.*

22. The composition of claim 21 wherein the coating composition solvent comprises mineral spirits, methanol or mixtures thereof.

23. The composition of claim 21 wherein the inorganic filler comprises a clay, a silica, [carbon black,] or mixtures thereof.

24. A coating composition that can be applied to marine surfaces to form a durable, tough, flexible film and can release an effective amount of marine biocide, which comprises:

(a) an effective amount of a coating composition solvent comprising a mixture of mineral spirits and methanol;

(b) a portion soluble in the solvent comprising about 10 to 15 parts of a copolymer of tri-n-butyl tin methacrylate and methyl methacrylate and about 3 to 4 parts of a film-forming methyl methacrylate; and (c) a portion insoluble in the solvent comprising a hydrophobic crosslinked tri-n-butyl tin acrylic composition; about 16 to 18 parts of an inorganic silicate filler; about 1 to 3 parts of a clay thickener and about 1 to 4 parts of carbon black; each component present per one hundred parts of the coating composition.

* * * * *

UNITED STATES PATENT AND TRADEMARK OFFICE

CERTIFICATE OF CORRECTION

PATENT NO. : Re. 33,048

DATED : September 5, 1989

INVENTOR(S) : Albert L. Kimmel, Cecil C. Chappelow, Jr., and Vincent J. Castelli It is certified that error appears in the above-identified patent and that said Letters Patent is hereby corrected as shown below:

In Column 1, line 26, read "of" as --or--.

In Column 3, line 54, read "ing preferred" as --ing. Preferred--.

In Column 3, line 64, read "acylate" as --acrylate--.

In Column 4, lien 19, read "methylacylate" as --methylacrylate--.

In Column 5, line 62, read "technically" as --ethylenically--.

In Column 7, line 8, read "clays" as --clays,--.

In Column 7, line 53, read "composition." as --composition solvent each per one hundred parts of the coating composition.--.

In Column 8, line 33, read "place" as --placed--.

In Column 8, line 58, read "174" as --1/4--.

In Column 9, read Table III as including:

UNITED STATES PATENT AND TRADEMARK OFFICE

CERTIFICATE OF CORRECTION

PATENT NO. : Re. 33,048

DATED : September 5, 1989

INVENTOR(S) : Albert L. Kimmel, Cecil C. Chappelow, Jr., and Vincent J. Castelli

It is certified that error appears in the above-identified patent and that said Letters Patent is hereby corrected as shown below:

TABLE III-continued

SHIP TEST OF COATINGS
WATER LINE TO KEEL STRIDE

| | Example No. | | | | | | | |
|---|---|---|---|---|---|---|---|---|
| | IV USS OUEL-LETTE | | I USS OUEL-LETTE | | IV USS INGRAM | | I USS INGRAM | |
| Ship Name | | | | | | | | |
| Stripe # | 1 | 2 | 1 | 2 | 1 | 2 | 1 | 2 |
| Film Thickness (mils) | 4 | 12 | 4 | 12 | 4 | 8 | 4 | 8 |
| Fouling Resistance* | | | | | | | | |
| 6 mos. | 100 | 100 | 100 | 100 | 100 | 100 | 100 | 100 |
| 12 mos. | 100 | 100 | 100 | 100 | 100 | 100 | 100 | 100 |
| 18 mos. | 100 | 100 | 100 | 100 | 100 | 100 | 100 | 100 |
| 24 mos. | 100 | 100 | 100 | 100 | 100 | 100 | 100 | 100 |
| 30 mos. | 100 | 100 | 100 | 100 | 100 | 100 | 100 | 100 |
| 36 mos. | 100 | 100 | 100 | 100 | - | - | - | 100 |
| 53 mos. | - | - | - | - | 85 | 85 | 100 | 100 |
| 57 mos. | 90 | 90 | 100 | 100 | - | - | - | - |

UNITED STATES PATENT AND TRADEMARK OFFICE

CERTIFICATE OF CORRECTION

PATENT NO. : Re. 33,048

DATED : September 5, 1989

INVENTOR(S) : Albert L. Kimmel, et al

It is certified that error appears in the above-identified patent and that said Letters Patent is hereby corrected as shown below:

TABLE 111-continued

*percent free of fouling

Signed and Sealed this

Fourth Day of December, 1990

*Attest:*

HARRY F. MANBECK, JR.

*Attesting Officer*

*Commissioner of Patents and Trademarks*